(12) United States Patent
Poret et al.

(10) Patent No.: US 6,684,561 B2
(45) Date of Patent: Feb. 3, 2004

(54) BOOKLET FOR USE IN PLANT GERMINATION AND TRANSPLANTATION

(75) Inventors: Florence Poret, Kaufbeuren (DE); Anthony Samuel, New York, NY (US)

(73) Assignee: Demo L.L.C., Los Angeles, CA (US)

( * ) Notice: Subject to any disclaimer, the term of this patent is extended or adjusted under 35 U.S.C. 154(b) by 0 days.

(21) Appl. No.: 10/138,747

(22) Filed: May 3, 2002

(65) Prior Publication Data

US 2003/0204992 A1 Nov. 6, 2003

(51) Int. Cl.[7] .................................................. B65D 1/34
(52) U.S. Cl. ......................................................... 43/73
(58) Field of Search .................. 47/73, 87; B65D 1/34, B65D 1/36, 8/50, 8/52

(56) References Cited

U.S. PATENT DOCUMENTS

| | | | |
|---|---|---|---|
| 3,112,577 A | | 12/1963 | Burger |
| 3,257,754 A | | 6/1966 | Ohsol |
| 3,315,718 A | * | 4/1967 | Berman ........................ 220/837 |
| 4,209,945 A | | 7/1980 | Dent et al. ....................... 47/84 |
| 4,418,497 A | | 12/1983 | Mastriano |
| 5,210,975 A | | 5/1993 | Beckerman ..................... 47/56 |
| 5,310,061 A | * | 5/1994 | Kanbar ......................... 206/555 |
| 6,050,027 A | | 4/2000 | Pavelka et al. |
| 6,306,645 B1 | * | 10/2001 | Tanklevsky et al. ..... 435/297.1 |

FOREIGN PATENT DOCUMENTS

| | | | | |
|---|---|---|---|---|
| CH | 676823 | | 3/1991 | |
| DE | 8509836.1 | | 1/1986 | |
| FR | 2 584 983 | | 1/1987 | |
| FR | 2693348 | | 1/1994 | |
| FR | 2733741 A1 | * | 11/1996 | ........... B65D/75/32 |
| FR | 2812561 A1 | * | 2/2002 | ........... B01D/24/16 |
| WO | WO 94/00975 | | 1/1994 | |
| WO | WO 9400975 A1 | * | 1/1994 | ............ A01C/1/04 |

OTHER PUBLICATIONS www.bloomin.com; copyright 2000.

* cited by examiner

*Primary Examiner*—Charles T. Jordan
*Assistant Examiner*—Susan C. Alimenti
(74) *Attorney, Agent, or Firm*—Morgan & Finnegan, L.L.P.

(57) ABSTRACT

A booklet used in germination and transplantation for plant material is disclosed. The booklet can easily be sent through regular mail without damaging the plant matter. Delayed germination is available by use of hygroscopic material. The booklet can have multiple trays that are removable for easy transplantation into a pot or garden. The tray can further include an inlet port for water and a water chamber for released germination. Learning material can be included in the booklet, as well as decorative or marketing material. The information in the booklet can be in the form of print, electronic display, stained glass or any other format.

30 Claims, 7 Drawing Sheets

BOOKLET FOR USE IN PLANT GERMINATION AND TRANSPLANTATION

FIELD OF THE INVENTION

The present device relates generally to the field of transportable containers used in plant germination, and more specifically, to a booklet that can easily store and transport plant matter for future germination and transplantation. The booklet also can be used for marketing or instructional purposes.

BACKGROUND

It is usually customary to offer flowers, trees or other plants for birthdays, holidays or other occasions. Seeds, bulbs or other types of spouts may be given in lieu of a plant, which give the added benefit of allowing the recipient to plant and observe the growth of the plant or flowers from the beginning. Seeds and bulbs are typically stored and transported in packets or pouches. In order to germinate, the sprouts must be planted in soil and watered. Thus, germination from the packets or pouches alone is not obtainable. Another disadvantage of seeds or bulbs is that the packets or pouches are not easily transportable. For example, sending seeds in a seed packet via regular mail to a recipient can easily damage the seeds by crushing them in the mail or through exposure to harsh weather conditions. Likewise, full grown plants are not easily transportable. Sending a plant by regular mail can get very messy with the soil spilling out of the container holding the plant. Thus, whole plants or seed packets are not easily transportable.

In U.S. Pat. No. 4,418,497 to Mastriano, a combination greeting card, ornament and seed germination receptacle is disclosed. The container in Mastriano provides for the mailing of a seed germination packet, but the packet needs to have a relatively low profile to be mailed in an envelope. Having a low profile limits the types of plant life that can be transported. For example, some plant life requires germination in a deeper soil which would not be possible in a container with a low profile as shown in Mastriano. In addition, Mastriano does not allow the transplantation of the germinated seeds. Mastriano illustrates a receptacle, in the form of an ornament, for holding a seed germination packet that is bonded by an adhesive to the receptacle. In order to transplant the seed germination packet, the ornament must be dismantled or destroyed thereby destroying the greeting portion of the receptacle. In addition, the packet can not be transplanted easily because it is bonded to the receptacle. If the seed germination packet was not bonded to the receptacle, the seeds would be damaged in the mail because the packet would be tossed around in the envelope during shipping.

French patent number FR 2 693 348 (and corresponding International Publication number WO 94/00975) discloses a postcard with a seed container, where the seed container is for germinating seeds. Again, the seed container is limited to the depth of germination that is available. The seed container is not preferred to be very deep to allow mailing of the seed container. If a deeper seed container is used, the seed container must have a corresponding larger surface area compared to its depth to allow absorption of water. Thus, a deeper container can not be used in FR 2 693 348 unless the overall container is significantly larger than the depth of the container. This relationship means that the overall size of the container as taught by FR 2 693 348 would be too bulky to transport through the mail if a deep tray was used.

Furthermore, the relatively small size and shallow depth of the seed container as taught by FR 2 693 348 is such that the contents of the seed container must be watered relatively frequently. Thus, the degree of flexibility for use as a marketing or advertising tool is limited. Lastly, the overall container is unstable, and not able to withstand wind, if for example placed on a window ledge or area of high traffic. The card extends from the seed container portion, substantially parallel to the upper surface of the container and can cause the container to become unbalanced due to a moment created about the edge of the container. The "center of gravity" of the extending portion of the container in FR 2 693 348 has a relatively large moment arm (½ the length of the card portion) with respect to the edge of the container. This moment arm creates a problem wherein the seed container tilts unnecessarily, thereby creating an increased possibility for spillage.

In addition, the germination in the FR 2 693 348 can not be easily transplanted. The container shown in FR 2 693 348 has an integrally molded seed receptacle and postcard backing, which extends from the seed receptacle. The integral nature of the formation of the card makes transplanting the seed container impossible. The card must be destroyed in order for the plant to be transplanted in another container or the ground.

Current commercially available product that provides greeting cards embedded with seeds requires that the entire card be planted. This type of container prohibits the use of the information or marketing material provided on the card by requiring that the card be destroyed.

Thus, there remains a need in the art for a transportable plant container that protects the contents of the plant matter and allows the future germination to be transplanted without destroying the container that may have some greeting information or marketing material. In addition, a need exists to have a container that is easily transportable, for example in regular mail, without that is not limited to a certain depth of the seed container.

SUMMARY OF THE INVENTION

The present invention avoids many of the disadvantages of previous germination and transplantation devices. A booklet for use in germination and transplantation includes a base having a first cover and a second cover. The first cover is for containing indicia and coupled to the second cover. The second cover defines an insert portion such that the insert portion encompasses a majority of the second cover. A tray is disposed in the insert portion of the second cover. The tray further includes plant material. A lid may be sealed to the tray for delayed germination and secure transport of the plant material.

The easily transplantable delayed germination device of the present invention comprises a molded polymer tray. The tray is attached to a substrate, which may be made of paper or another material, and a cover for the tray is formed either by a portion of the substrate or by a separate piece of material. Within the space created by the molded polymer tray and the cover of the tray, are flower or other plant seeds. The seeds are placed in the tray with a time-release fertilizer and a water-absorbing medium, such as polyacrylamide. The water-absorbing medium absorbs the water that is introduced to the tray, but allows the seeds to draw the water that is needed for germination and growth, and the fertilizer provides the necessary nutrients for growth. The contents of the tray (seeds, water absorbent medium and fertilizer) can be held into the tray by way of a mesh-like material. The mesh may be attached such that it is attached around the edge of the tray, and when the cover of the tray is removed, the mesh material remains on top of the contents of the tray. The contents of the tray are watered regularly and eventually the seeds germinate and grow. Eventually, one may trim the plants as needed and/or transplant the sprouted plants into soil.

In addition, the booklet can have multiple trays that are removable for easy transplantation into a pot or garden. This multiple mini-tray design allows the use of diffent plant matter to be used in the same booklet. The tray can further include an inlet port for water and a water chamber for released germination. Learning material can be included in the booklet, as well as decorative or marketing material. The information in the booklet can be in the form of print, electronic display, stained glass or any other format.

These, and other aspects of the apparatus and method of use of the orientation device, are described in the following brief and detailed description of the drawings.

DETAILED DESCRIPTION

Figure 1:
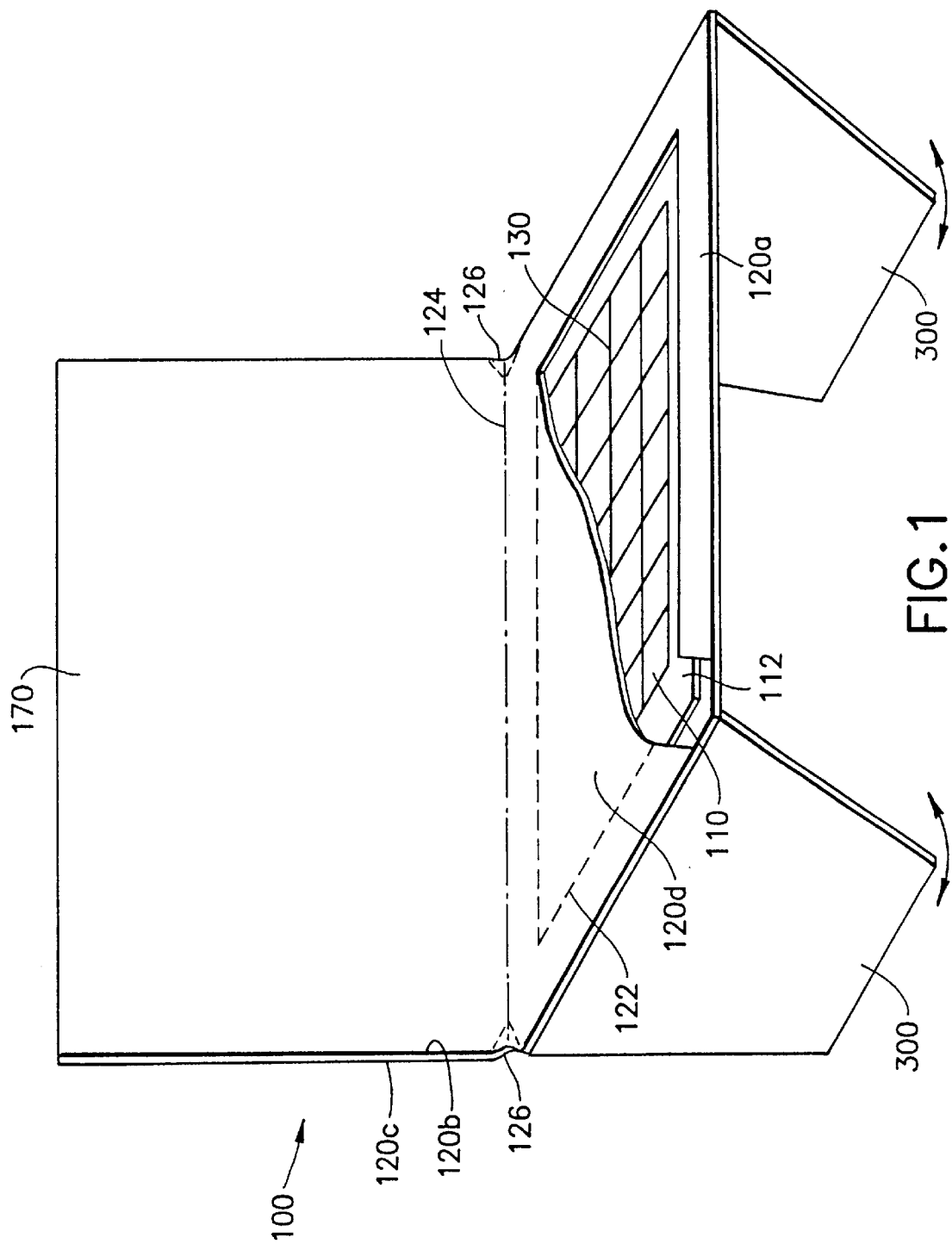
FIG. 1 is a perspective view of a booklet for plant germination and transplantation.

The booklet is generally identified by the numeral 100 and may, depending on the implementation, take on the form of a molded tray 110 attached to a substrate 120a. The tray may be made out of polyvinyl chloride (PVC), or other plastic material, rubber material or a lightweight metal such as an aluminum based material, or a waterproof paper-based material. The substrate 120 may be made of water-resistant or waterproof laminated paper, other wood products, such as a wood veneer, a plastic material, a rubber material, a metal material or any combination thereof. The tray may be formed by any of a variety of methods, including but not limited to vacuum-forming, casting, molding, stamping, pressing, milling or any combination thereof.

The substrate 120 may form all, part or none of the cover of the tray. The upper substrate 120b may extend from the edges where it attaches to the tray and/or the lower portions substrate 120c, to completely cover the tray as illustrated in portion 120d. There may be perforations 122 in the substrate so that the portion that covers the tray 120d may be removed easily, leaving the remainder of the substrate 120 in tact. This may require the cover portion of the substrate 120d to be bonded or glued in a fashion such that it can be removable, yet still securely hold the contents of the package 140, 150, 160. Alternatively, the substrate 120 may not cover the recessed portion of the tray 110, but only the flange 112 that supports the rest of the tray 110.

In lieu of the substrate acting as a cover, another removable element may be used, such as a sticker (not shown in FIG. 1). Alternatively still, the substrate may form a potion of the cover, and another element may form the remainder of the cover.

Seeds 150 are placed in the polymer tray 110 with a water-absorbing medium 140 and time-release fertilizer 160. When water is added, the hydrophilic water-absorbing medium (such as Stockosorb® polyacrylamide) 140 absorbs the water, and allows the seeds to take water as needed. Seeds used may include, but would not be limited to flower seeds, grass seeds, plant seeds and the like. Seeds in keeping with the display material 172 on an display portion 170 would be the most probable choice. For example, if the display portion is used as a mother's day card, for example, then flower seeds might be enclosed. If the display portion were a holiday card, then poinsettia seeds might be desirable and if the card were to be used as commemorative for a sporting event, then grass seeds could be used. The possible choices and combinations of seeds and display material are many. Furthermore, seeds with a fast germination process may be used.

The substrate 120 may only cover the tray 110, and/or may cover the tray 110 and comprise additional portions 170 that open to become a display for marketing material such as illustrations, photographs, text, holograms, or any combination thereof. The substrate 120 may have sections removed to allow transparent, translucent or other materials to be used. The substrate 120 may be attached to the tray 110 by a variety of means, including, but not limited to adhesives, mechanical fasteners or by sandwiching a portion of the tray between two or more pieces of the substrate which are in turn attached or bonded to each other, such that the substrate is thereby held firmly by the substrate. The indicia displaying portion 170 of the substrate 120 may be fixed to extend vertically from the edge of the tray 110. Thus, the moment arm of the center of gravity of the indicia displaying portion with respect to the edge of the tray portion is reduced over the prior art.

In the embodiment shown in FIG. 1, the substrate is provided with a portion 120b which during transportation lies flat over the cover of the tray, but opens to become a (predominantly) vertical portion and is connected to the remainder of the substrate, shown here attached along one edge; the indicia displaying portion 170 is integral with this portion. The displaying portion may, depending on the embodiment take on various different forms. For example the display portion may include, but is not limited to, a computer display, a hologram, a light source, an advertisement, a book, a children's book, a stained glass, a sun shade, or any combination thereof.

At the lengthwise fold in the substrate 124, where the vertical portion 120b meets the portion of the substrate that attaches to the tray 120a, V-shaped folds 126 are formed on the fold between the substrate and the vertical portion 124 to stiffen the joint. When the device is completely opened (180 degrees between surfaces of the substrate, the creases where the reinforcing folds are made can be seen as "V's". The V portions 126 are folded in toward the tray, toward what would be the inside of the card if the card were closed.

The water that is added may alternatively be a mixture of water and other elements such as fertilizer, to provide the plant with necessary nutrients. Food coloring or vegetable dyes 180 may also be incorporated into the tray, either into the mixture when transported, or during the growth cycle of the plants. This may be desirable in some instances where the plant will take in the dyes and thereby become colored, as is often done with carnations. Additional fertilizer, seeds, or water-absorbing medium may be added before, during or after the growth cycle to sustain the growth or to add new growth.

The fertilizer that is used may be a fertilizer that contains assimilable nitrates without ammonium, which would release the essential calcium, magnesium, phosphorous ions, as well as nitrates when water is added.

The device may incorporate more than one tray, not necessarily with the same type of seeds. One tray may be used for one type of plant or mixture of plants, and another tray for another type of plant or mixture of plants. The contents of the trays may be grown simultaneously or consecutively. It would allow for one device to provide a variety of plants at the same time or over a period of time.

The device may comprise a water containing portion having a passageway and breakable/removable partition between it and the seed-containing tray. This would allow the sender to burst the water containing portion before sending the device. This would start the germination process and the device would arrive to the recipient in an advanced state of germination. This would allow these benefits, while also allowing the device to have a near-indefinite shelf life. Similarly, the device may comprise a portion with a one-way valve or tube or a portion to interface with a one-way valve or tube. This would allow the sender to "inject" water into the device before shipment via a water-filled syringe or other like device. A penetrable but automatically re-sealable portion, such as those on injectable-medicine bottles may be incorporated. Further, the tray may be manufactured with a vacuum such that the added water does not cause the device to become overfull, but merely fills out the space available when the internal pressure is equalized.

An alternative embodiment of this invention would be to incorporate one or more trays having seeds and fertilizer, into a book. The book may be used as an educational medium wherein the reader, most likely a child, may read about a type of plant, and then grow and observe the growth of the plant. The book could contain multiple types of seeds in multiple trays so that different plants could be grown at different times. Information regarding the life cycle of a plant, as well as other information, may be included in the book.

An additional embodiment of this invention comprises the use of a hygroscopic material such that the germination device would not require manual watering, depending on the environmental conditions. The material would absorb moisture from the surrounding air and store it to release it to the seeds. This would allow for a more maintenance-free device. This could also allow many different uses of the device. If a hygroscopic material were used in the tray with seeds, the device could be placed in areas in which it would otherwise be impractical to have live plants, such as in a location high above the floor of a room. It could also allow the devices to be attached to a wall or other surface, when used in combination with an adhesive on the bottom of the tray and/or a method to prevent the contents of the tray from falling from the tray, such as a mesh-like material.

Finally, after a time, it might not be possible to keep the grown plants alive in the tray if they have become too large for the tray to physically and/or nutritively support them. At such a point, the plant(s) may be transplanted into soil for continued growth, or trimmed, depending on the type of plant.

The booklet may also contain support legs 300, although these support legs are not required for the invention to function properly. The support legs would allow the tray to be elevated and prevent any pooling of water that may leak out of the tray.

Figure 2:
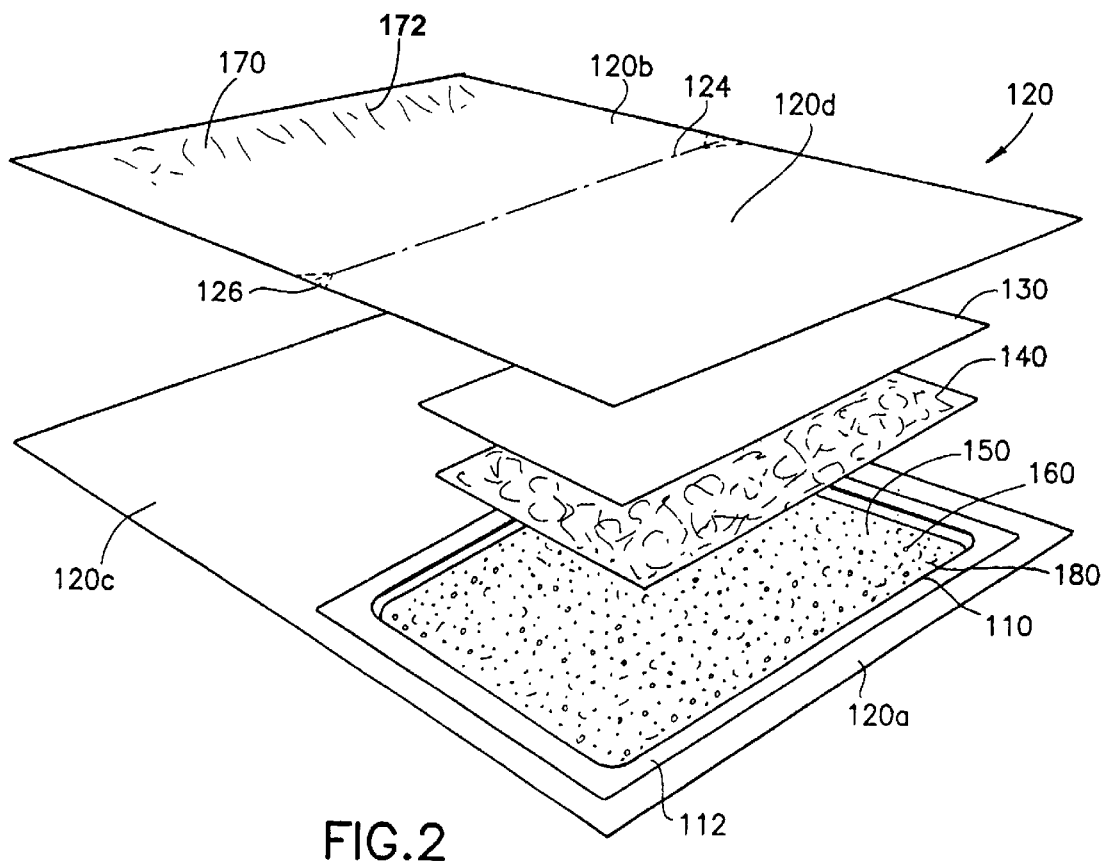
FIG. 2 is an exploded view of the device in FIG. 1.

FIG. 2 illustrates an exploded view of the booklet shown in FIG. 1. The booklet may contain a mesh 130 that is place over the plant matter in the tray, the mesh provides security for the plant matter and holds the plant matter in place during transportation. The mesh may be made of plastic, aluminum, metal or any combination of the like. The mesh may be sized to a grid size between about 20 to about 120 grids per inch depending on the plant matter.

Figure 3:
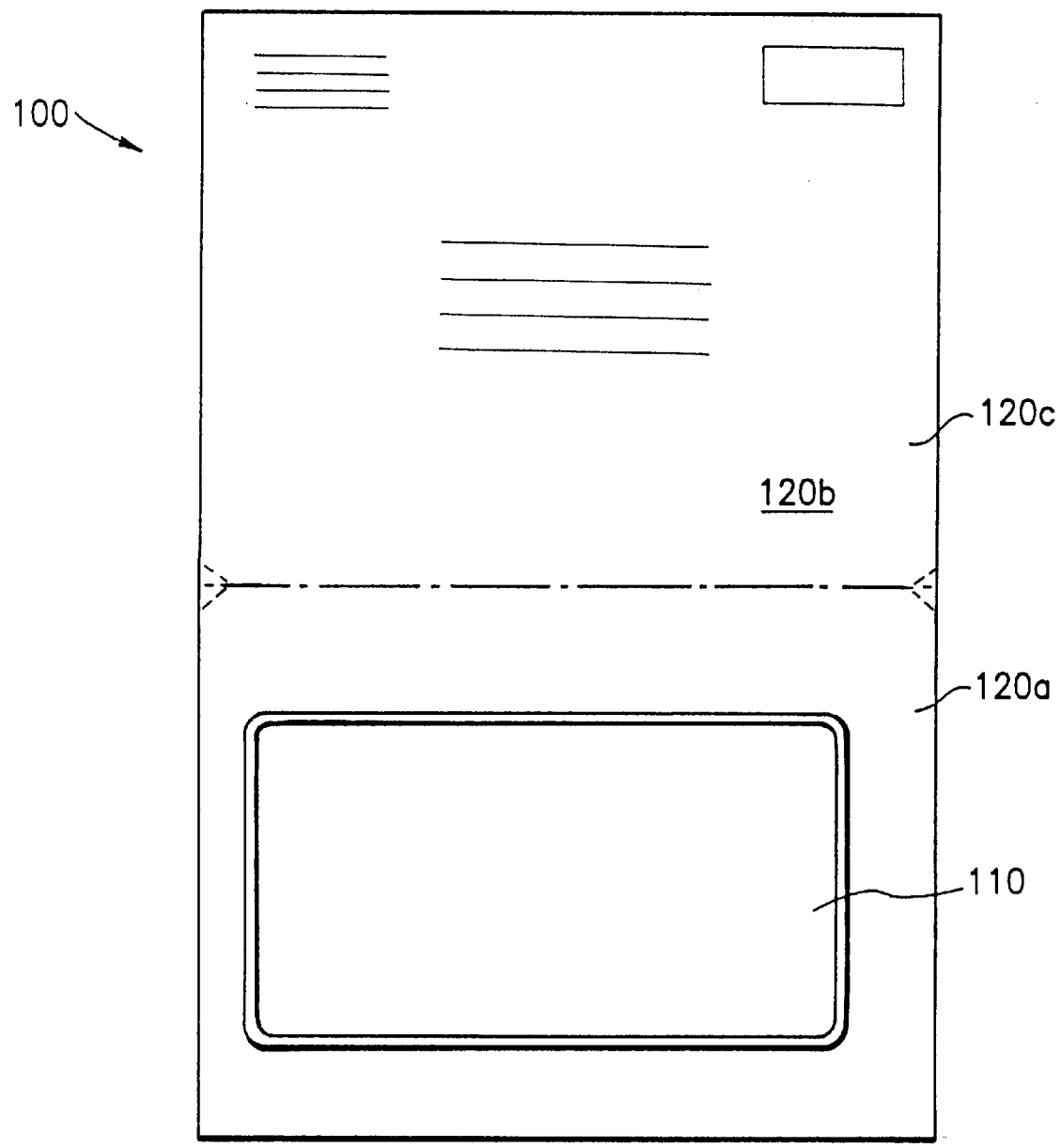
FIG. 3 is a top view of the booklet in FIG. 1 with the covers in the fully open position.

FIG. 3 illustrates a top view of the booklet in FIG. 1. The top cover of the booklet may be able to lay parallel with the bottom cover containing the tray 110. The tray 110 covers a majority of the area of the bottom cover to maximize the growing potential of the plant matter. Depending on the embodiment, the top and bottom cover may be made of a unitary structure being separated by a fold or perforation.

Figure 4:
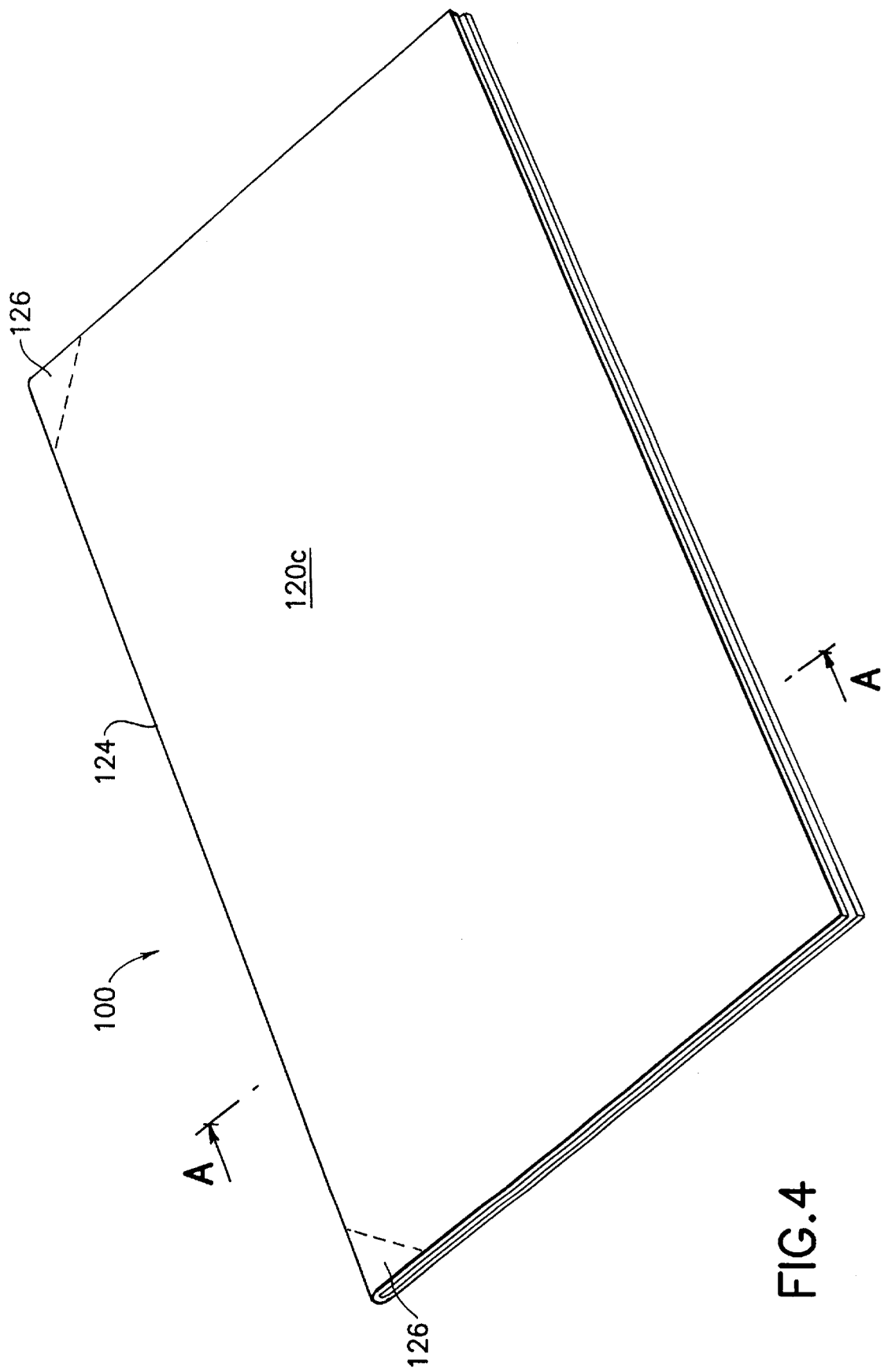
FIG. 4 is a perspective view of the booklet in FIG. 1, with the covers in the closed position.

FIG. 4 is a perspective view of the booklet in FIG. 1 in the closed position. When mailed, the booklet will take on this format. The booklet can be made to between about $\frac{1}{16}$ to about $\frac{3}{4}$ inches thick making easy to mail. The V-shaped folds 126 can be utilized to open the top cover easily to expose the plant matter.

Figure 5:
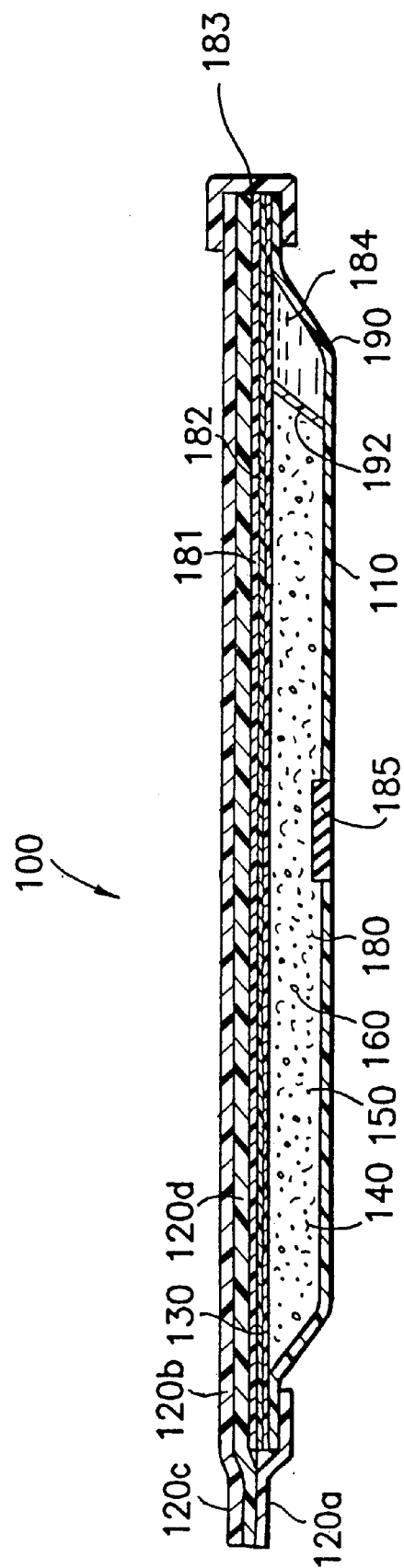
FIG. 5 is a cross-sectional view taken along line A—A in FIG. 4.

FIG. 5 is a cross section view of the booklet shown in FIG. 4. The booklet, depending on the embodiment, may be equipped with an injection port 185. Preferably, the injection port is centrally located in the tray to distribute the liquid to the plant matter evenly, however, the invention is not so limited to such a location. Inlet valve 185 may be a rubber gasket that is sealable after puncturing to inject liquid to start germination as previously described. The booklet 100 shown in this embodiment does not have the support legs 300. The booklet may or may not contain support legs depending on the embodiment.

In addition, the booklet may contain an internal water reservoir to assist in germination of the plant matter. Shown as a reservoir 184 disposed above a tray wall 190, the reservoir 184 may be activated by the user or recipient of the booklet when desired. A seal 192 may be broken by piercing it to expose the plant matter to the liquid inside the reservoir. the reservoir may contain water, fertilizer, or both.

A hinge 183 may connect the top and bottom covers. This hinge may be in the form of a book binder, depending on the embodiment. A film layer 181 may cover the plant matter during transportation to assist in keeping the plant matter inside the tray during transportation. A secondary film layer 182 may also be used to cover the plant matter after germination to keep the seeds from any undue frost at night. the film 182 may be made of plastic, cloth or the like.

Figure 6:
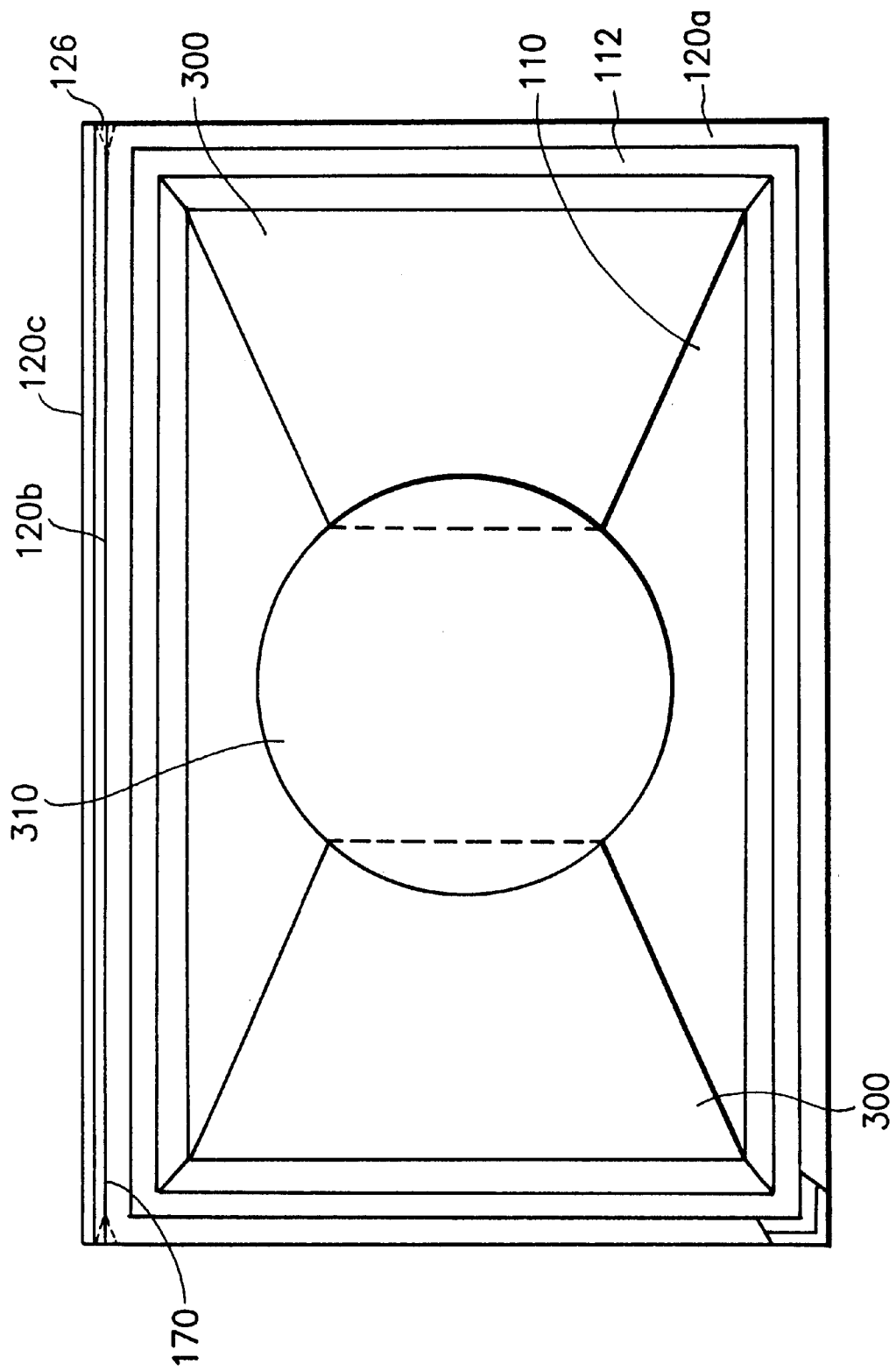
FIG. 6 is a bottom view of the device in FIG. 1 when the cover is in the open position illustrating the tray portion.

FIG. 6 is a bottom view of the booklet in FIG. 1. Again, the support legs may be foldable beneath the booklet. The support legs 300 may be unfolded at any time. An adhesive latch 310 may be used to secure the support legs to the booklet during shipping. the adhesive lath may be easily removed during use and disposed.

Figure 7A:
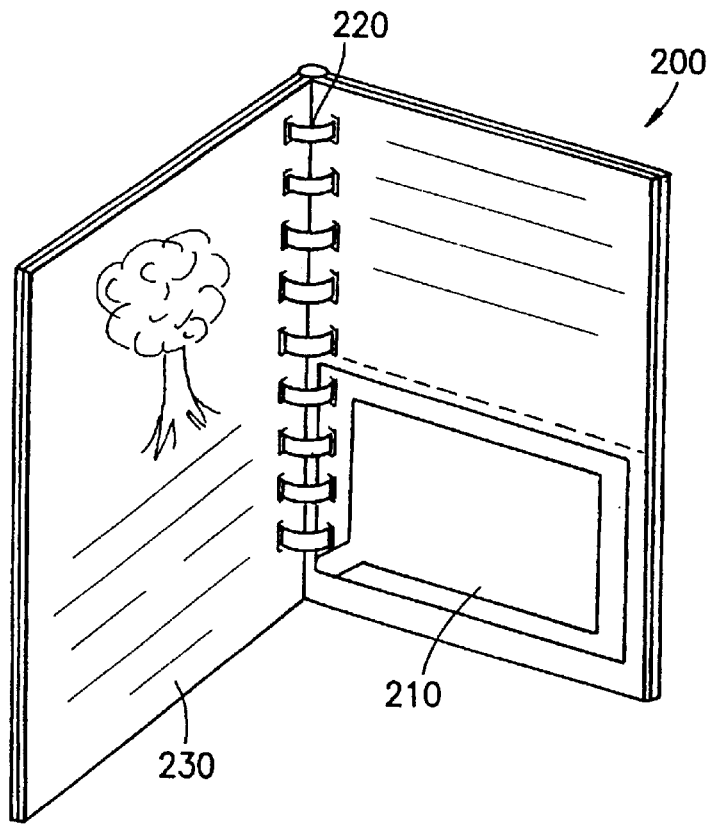
FIG. 7A is a perspective view of the booklet in FIG. 1 illustrating the use of the booklet in a particular application.

FIG. 7A is one example of an application of the booklet. Shown is a children's booklet 200. The booklet 200 has a information registry 230 that contains content particularly applicable to the plant matter in tray 210. The registry 230 is attached to the first cover. The first and second covers may be attached by a book binder 220 to allow pages to be turned. The registry may be removable from the booklet 200 for future use after the tray 210 is removed and transplanted.

Figure 7B:
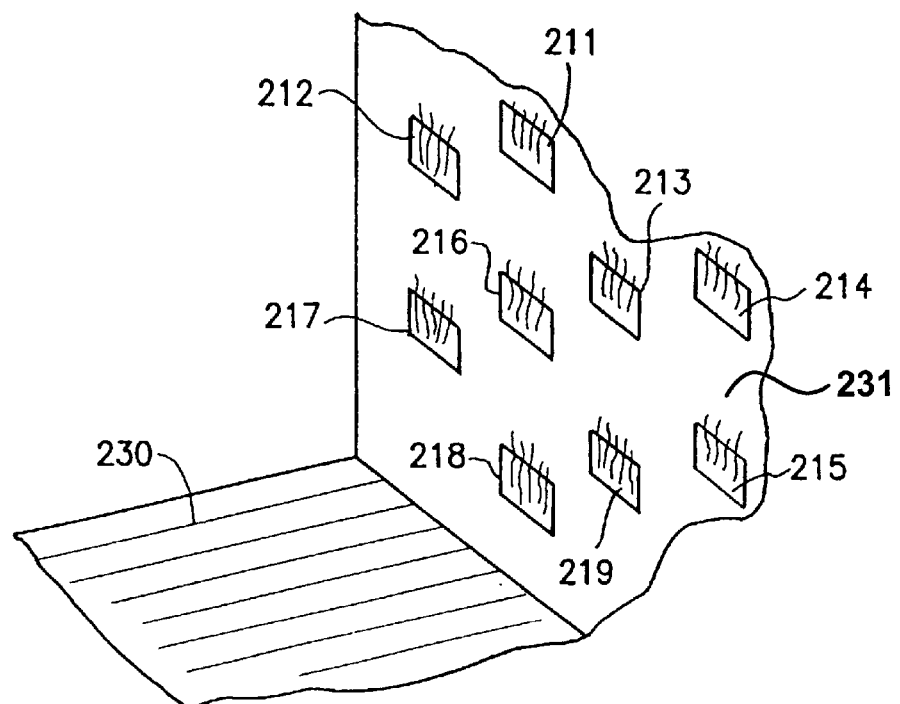
FIG. 7B is an enlarged perspective view of FIG. 7A.

FIG. 7B is an enlarged view of another embodiment of tray 210 shown in FIG. 7A. In this embodiment, the tray is separated into mini-trays 211, 212, 213, 214, 215, 216, 217, 218, and 219. The mini trays allow the use of various plant matter in the same booklet. A host tray 231 is used to hold the mini trays in place. The registry 230 may also be used with the mini trays to explain the growth of the various plant matter and provide further information about the plant matter or other information such as marketing or advertisement.

It should be understood that the above description is only representative of illustrative examples of embodiments and implementations. For the reader's convenience, the above description has focused on a representative sample of all possible embodiments, a sample that teaches the principles of the invention. Other embodiments may result from a different combination of portions of different embodiments. The description has not attempted to exhaustively enumerate all possible variations.

Furthermore, since numerous modifications and variations will readily occur to those skilled in the art, it is not desired that the present invention be limited to the exact construction and operation illustrated. Accordingly, all suitable modifications and equivalents which may be resorted to are intended to fall within the scope of the claims.

What is claimed is:

1. A booklet for use in germination and transplantation, comprising:
    a base having a first cover and a second cover, the first cover for containing indicia and hingably connected to the second cover, the second cover defining an aperture such that the aperture encompasses a majority of the second cover;
    a removable tray disposed in the aperture of the second cover, the tray having flanges and further containing at least plant matter;
    a lid hermetically sealed to the tray for delayed germination and secure transport of the plant matter; and
    a mesh connected to the tray to support the plant matter and prevent the plant matter from moving during transportation of the booklet; and
    a decorative overlay to attach the tray to the second cover by spreading over the surface of the flanges and the second cover.

2. The booklet according to claim 1, wherein the second cover further includes an adhesive backing.

3. The booklet according to claim 1, wherein the tray is divided into multiple removable mini-trays to support different types of plant matter.

4. The booklet according to claim 1, wherein the base is a laminated paper-based substrate.

5. The booklet according to claim 1, wherein the tray is formed out of at least one of the following materials: polyvinyl chloride, an aluminum-based material, a plastic material, a paper-based material, a rubber material, a biodegradable material.

6. The booklet according to claim 1, further including a time-release fertilizer, and a water-absorbing medium contained within the tray.

7. The booklet according to claim 6, wherein the water absorbing medium is polyacrylamide.

8. The booklet according to claim 1, wherein the plant matter includes bulb or seeds from at least one of the following: vegetable, fruit, herbs, spices, clover, ivy, grass, flower, tree, shrub, bush, and any combination thereof.

9. The booklet according to claim 1, further including a reservoir portion in communication with the tray for releasing liquid into the tray to begin germination of the plant matter.

10. The booklet according to claim 1, wherein the indicia is pictures for advertisement.

11. The booklet according to claim 1, wherein the first cover includes a computer display to display electronic media.

12. The booklet according to claim 1, wherein the first cover includes stained glass.

13. A booklet for use in germination and transplantation, comprising:
    a base having a first cover and a second cover, the first cover for containing indicia and coupled to the second cover, the second cover defining an insert portion such that the insert portion encompasses a majority of the second cover;
    a tray disposed in the insert portion of the second cover, the tray further containing at least plant material;
    a lid sealed to the tray for delayed germination and secure transport of the plant material; and
    an inlet valve for injecting water or nutrient-containing liquid into the tray.

14. The booklet according to claim 9, wherein the inlet valve is a self-sealing rubber gasket positioned at the bottom of the tray.

15. A booklet for use in germination and transplantation, comprising:
    a base having a first cover and a second cover, the first cover for containing indicia and hingably connected to the second cover, the second cover defining an insert portion such that the insert portion encompasses a majority of the second cover;
    a tray disposed in the insert portion of the second cover, the tray further containing at least plant matter;
    a lid sealed to the tray for delayed germination and secure transport of the plant matter; and
    a mesh disposed within the tray to support the plant matter and prevent the plant matter from moving during transportation of the booklet.

16. The booklet according to claim 15, wherein the first cover is a children's book having information concerning the plant mater disposed in the tray.

17. The booklet according to claim 15, wherein the first cover is rotatable about the second cover at least 90 degree for display of the indicia.

18. The booklet according to claim 15, wherein the mesh has a mesh size of about 20–120 grid size per inch.

19. The booklet according to claim 15, wherein the mesh is made of plastic, aluminum, metal or any combination thereof.

20. The booklet according to claim 15, wherein the insert portion is a through hole for the tray to fit through.

21. The booklet according to claim 20, wherein the tray further includes a lip portion to support the tray.

22. The booklet according to claim 15, wherein the first cover includes a hologram.

23. The booklet according to claim 15, wherein the first cover further includes a computer chip for processing information concerning the plant matter in the tray.

24. The booklet according to claim 15, wherein the first cover further includes a light source for radiating ultra violet rays on the plant matter in the tray.

25. The booklet according to claim 15, wherein the thickness of the booklet when closed is between about 1/16 to about 3/4 of an inch.

26. The booklet according to claim 15, further including at least on support leg connected to the bottom of the second cover.

27. The booklet according to claim 26, wherein the support leg is foldable beneath the second cover.

28. The booklet according to claim 26, wherein the support leg is made of the same material as the second cover.

29. The booklet according to claim 15, wherein the first cover is a decorative sun shade.

30. The booklet according to claim 15, wherein the first cover is an advertisement.

* * * * *